(12) United States Patent
Wood, Jr.

(10) Patent No.: US 7,760,677 B2
(45) Date of Patent: *Jul. 20, 2010

(54) METHOD OF ADDRESSING MESSAGES AND COMMUNICATIONS SYSTEM

(75) Inventor: Clifton W. Wood, Jr., Boise, ID (US)

(73) Assignee: Keystone Technology Solutions, LLC, Boise, ID (US)

( * ) Notice: Subject to any disclaimer, the term of this patent is extended or adjusted under 35 U.S.C. 154(b) by 1217 days.

This patent is subject to a terminal disclaimer.

(21) Appl. No.: 11/143,395

(22) Filed: Jun. 1, 2005

(65) Prior Publication Data

US 2005/0207364 A1 Sep. 22, 2005

Related U.S. Application Data

(63) Continuation of application No. 09/820,467, filed on Mar. 28, 2001, now Pat. No. 7,315,522, which is a continuation of application No. 09/026,248, filed on Feb. 19, 1998, now Pat. No. 6,275,476.

(51) Int. Cl.
*H04J 3/16* (2006.01)
*H04L 12/413* (2006.01)

(52) U.S. Cl. .................. 370/312; 370/346; 370/445; 345/42; 340/10.1

(58) Field of Classification Search ........................ None
See application file for complete search history.

(56) References Cited

U.S. PATENT DOCUMENTS

| 4,075,632 A | 2/1978 | Baldwin et al. | ............... 343/6.8 |
| 4,761,778 A | 8/1988 | Hui | ............................. 370/46 |

(Continued)

FOREIGN PATENT DOCUMENTS

EP 0 779 520 9/1997 ..................... 13/82

(Continued)

OTHER PUBLICATIONS

EPC™ Radio Frequency identity Protocola Class-1 Generation-2 UHF RFID Protocol for Communications at 860 MHz—960 MHz, *EPC Global, Inc.* Version 1.0.9, Cover Sheet and pp. 37-38 (Jan. 2005).

(Continued)

*Primary Examiner*—Chi H. Pham
*Assistant Examiner*—Soon D. Hyun
(74) *Attorney, Agent, or Firm*—Greenberg Traurig, LLP

(57) ABSTRACT

In one among many embodiments, the invention provides a system including an interrogator communicating to a selected one or more of a number of communications devices. A plurality of communications devices select random values independently of random values selected by other devices. The interrogator transmits a first signal requesting devices within a specified group of devices to respond, the specified group being less than or equal to all of the devices within a field of the interrogator. Devices receiving the first signal respectively determine if the respective device falls within the specified group and, if so, send a reply including a respective random value to the interrogator within a randomly selected time slot of a number of slots; and, if not, do not send a reply. The interrogator determines if a collision occurred between devices that sent a reply. The interrogator also creates a new, different specified group.

31 Claims, 4 Drawing Sheets

U.S. PATENT DOCUMENTS

| | | | |
|---|---|---|---|
| 4,796,023 A | 1/1989 | King | |
| 4,799,059 A | 1/1989 | Grindahl et al. | 340/870.03 |
| 4,845,504 A | 7/1989 | Roberts et al. | 342/457 |
| 4,862,453 A | 8/1989 | West et al. | 370/314 |
| 4,926,182 A | 5/1990 | Ohta et al. | 342/44 |
| 4,955,018 A | 9/1990 | Twitty et al. | 370/85.1 |
| 4,969,146 A | 11/1990 | Twitty et al. | 370/85.1 |
| 5,019,813 A | 5/1991 | Kip et al. | 340/825.54 |
| 5,025,486 A | 6/1991 | Klughart | 455/54 |
| 5,046,066 A | 9/1991 | Messenger | 370/94.1 |
| 5,055,968 A | 10/1991 | Nishi et al. | 361/737 |
| 5,121,407 A | 6/1992 | Partyka et al. | 375/206 |
| 5,124,697 A | 6/1992 | Moore | 340/825.53 |
| 5,142,694 A | 8/1992 | Jackson et al. | 455/67.11 |
| 5,144,313 A | 9/1992 | Kirknes | 342/42 |
| 5,144,668 A | 9/1992 | Malek et al. | 380/48 |
| 5,150,114 A | 9/1992 | Johansson | 340/825.08 |
| 5,150,310 A | 9/1992 | Greenspun et al. | 364/516 |
| 5,164,985 A | 11/1992 | Nysen et al. | 380/271 |
| 5,168,510 A | 12/1992 | Hill | 375/40 |
| 5,194,860 A | 3/1993 | Jones et al. | 340/370 |
| 5,231,646 A | 7/1993 | Heath et al. | 375/1 |
| 5,266,925 A | 11/1993 | Vercellotti et al. | 340/505 |
| 5,307,463 A | 4/1994 | Hyatt et al. | 395/275 |
| 5,365,551 A | 11/1994 | Snodgrass et al. | 375/141 |
| 5,373,503 A | 12/1994 | Chen | 370/95.2 |
| 5,449,296 A | 9/1995 | Jacobsen et al. | |
| 5,461,627 A | 10/1995 | Rypinski | |
| 5,479,416 A | 12/1995 | Snodgrass et al. | 714/785 |
| 5,500,650 A | 3/1996 | Snodgrass et al. | 342/42 |
| 5,530,702 A | 6/1996 | Palmer et al. | |
| 5,583,850 A | 12/1996 | Snodgrass et al. | 370/342 |
| 5,608,739 A | 3/1997 | Snodgrass et al. | 714/785 |
| 5,619,648 A | 4/1997 | Canale et al. | 709/206 |
| 5,621,412 A | 4/1997 | Sharpe et al. | 342/51 |
| 5,625,628 A | 4/1997 | Heath | 370/321 |
| 5,627,544 A | 5/1997 | Snodgrass et al. | 342/42 |
| 5,640,151 A | 6/1997 | Reis et al. | 340/10.2 |
| 5,649,296 A | 7/1997 | MacLellan et al. | 455/38.2 |
| 5,790,946 A | 8/1998 | Rotzoll | 455/343 |
| 5,805,586 A | 9/1998 | Perreault et al. | 370/346 |
| 5,841,770 A | 11/1998 | Snodgrass et al. | 370/346 |
| 5,914,671 A | 6/1999 | Tuttle | 340/10.42 |
| 5,936,560 A | 8/1999 | Higuchi | 341/106 |
| 5,940,006 A | 8/1999 | MacLellan et al. | 340/10.1 |
| 5,942,987 A | 8/1999 | Heinrich et al. | 340/10.42 |
| 5,952,922 A | 9/1999 | Shober | 340/572.4 |
| 5,966,471 A | 10/1999 | Fisher et al. | 382/253 |
| 5,974,078 A | 10/1999 | Tuttle et al. | 375/200 |
| 5,988,510 A | 11/1999 | Tuttle et al. | 235/492 |
| 6,038,455 A | 3/2000 | Gardner et al. | 455/447 |
| 6,061,344 A | 5/2000 | Wood, Jr. et al. | 370/346 |
| 6,072,801 A | 6/2000 | Wood, Jr. et al. | 370/437 |
| 6,075,973 A | 6/2000 | Greeff et al. | 455/38.2 |
| 6,104,333 A | 8/2000 | Wood, Jr. | 341/173 |
| 6,118,789 A | 9/2000 | Wood, Jr. | 370/462 |
| 6,130,602 A | 10/2000 | O'Toole et al. | 340/10.33 |
| 6,157,633 A | 12/2000 | Wright | 370/349 |
| 6,169,474 B1 | 1/2001 | Greeff et al. | 340/10.1 |
| 6,192,222 B1 | 2/2001 | Greeff et al. | 455/38.2 |
| 6,216,132 B1 | 4/2001 | Chandra et al. | 707/103 R |
| 6,226,300 B1 | 5/2001 | Hush et al. | 370/437 |
| 6,229,987 B1 | 5/2001 | Greeff et al. | 455/38.2 |
| 6,243,012 B1 | 6/2001 | Shober et al. | |
| 6,265,962 B1 | 7/2001 | Black et al. | |
| 6,265,963 B1 | 7/2001 | Wood, Jr. | 340/10.4 |
| 6,275,476 B1 | 8/2001 | Wood, Jr. | 370/312 |
| 6,282,186 B1 | 8/2001 | Wood, Jr. | 370/346 |
| 6,288,629 B1 | 9/2001 | Cofino et al. | |
| 6,289,209 B1 | 9/2001 | Wood, Jr. | 455/277.1 |
| 6,307,847 B1 | 10/2001 | Wood, Jr. | |
| 6,307,848 B1 | 10/2001 | Wood, Jr. et al. | 370/329 |
| 6,324,211 B1 | 11/2001 | Ovard et al. | 375/219 |
| 6,459,726 B1 | 10/2002 | Ovard et al. | 375/219 |
| 6,483,427 B1 | 11/2002 | Werb | |
| 6,566,997 B1 | 5/2003 | Bradin | 340/10.2 |
| 6,570,487 B1 | 5/2003 | Steeves | |
| 6,707,376 B1 | 3/2004 | Patterson et al. | 340/10.3 |
| 6,714,559 B1 | 3/2004 | Meier | |
| 6,771,634 B1 | 8/2004 | Wright | 370/349 |
| 6,778,096 B1 | 8/2004 | Ward et al. | |
| 6,850,510 B2 | 2/2005 | Kubler et al. | |
| 7,026,935 B2 | 4/2006 | Diorio et al. | 340/572.2 |
| 7,315,522 B2 | 1/2008 | Wood, Jr. | |
| 7,385,477 B2 | 6/2008 | O'Toole et al. | |
| 2003/0235184 A1 | 12/2003 | Dorenbosch | |
| 2005/0207364 A1 | 9/2005 | Wood, Jr. | |
| 2006/0022800 A1 | 2/2006 | Krishna et al. | 340/10.2 |
| 2006/0022801 A1 | 2/2006 | Husak et al. | 340/10.5 |
| 2006/0022815 A1 | 2/2006 | Fischer et al. | 340/505 |
| 2006/0056325 A1 | 3/2006 | Wood, Jr. | |
| 2006/0209781 A1 | 9/2006 | Wood, Jr. | |
| 2007/0139164 A1 | 6/2007 | O'Toole et al. | |
| 2007/0176751 A1 | 8/2007 | Cesar et al. | |
| 2008/0007412 A1 | 1/2008 | Wood, Jr. | |
| 2008/0042806 A1 | 2/2008 | Wood, Jr. | |
| 2008/0048832 A1 | 2/2008 | O'Toole et al. | |
| 2008/0048835 A1 | 2/2008 | O'Toole et al. | |
| 2008/0180221 A1 | 7/2008 | Tuttle | |

FOREIGN PATENT DOCUMENTS

| | | |
|---|---|---|
| EP | 779520 | 9/1997 |
| EP | 1072128 | 5/2008 |
| JP | 9054213 | 2/1997 |
| JP | 2002228809 | 8/2002 |
| WO | WO 97/48216 | 12/1997 |
| WO | 9943127 | 8/1999 |
| WO | 2008094728 | 8/2008 |

OTHER PUBLICATIONS

Wright, Jim, "Trends and Innovations in RF Identification", *SUN Microsystems, Inc.*, (presentation); 30 pp. (Mar. 2005).

Whitepaper, "Understnading Gen 2: What It Is, How You Will Benefit and Criteria for Vendor Assessment", *Symbol Technologies, Inc.*, 8 pp. (Jan. 2006).

Capetanakis, John I., "Generalized TDMA: The Multi-Accessing Tree Protocol," *IEEE Transaction on Communications*, vol. Com 27, No. 10, pp. 1476-1484 (Oct. 1979).

Wolf, Jack Keil, "Principles of Group Testing and an Application to the Design and Analysis of Multi-Access Protocols," NATO ASI Series E, Applied Sciences, N. 91, pp. 237-257 (1985).

Humblet, Pierre A., et al., "Efficient Accessing of a Multiaccess Channel", *Proc IEEE Conference Decis Control Incl Symp Adapt Processes 1*, p. 624-627 (1980).

EP serial No. 05016514.1 ; Extended Search Report and Search Opinion; mailed Jan. 26, 2007; 5 pp.

EP serial no. 05016513.3 ; Extended Search Report and Search Opinion; mailed Jan. 22, 2007; 5 pp.

http://www.rfid-handbook.com/, "Radio Frequency-Identification; The Autors Homepage of the RFID Handbook", © 1998-2006, 2 pp. (reprinted Feb. 22, 2007).

http://www.sal-c.org/, Smart Active Labeld (SAL) Consortium), © 2007, 1 page (reprinted Apr. 26, 2007).

U.S. Appl. No. 11/607,263, filed Dec. 1, 2006, John R. Tuttle.

ECC Report 1, "Compatability between Inductive LF and HF RFID Transponder and Other Radio Communication Systems in the Frequency Ranges 135-148.5 kHz, 4.78-8.78 MHz and 11.56-15.56 MHz"Electonic Comm. Committee, 14 pp. ( Feb. 2002).

http://216.121.131.129/article/articleview/330/1/1/; "EPC Doesn't Infringe RFID Patents", *RFID Journal*, 2 pp. (Mar. 4, 2003).

Mullin, Eileen, "Electonic Product Code", www.baselinemag.com, 4 pp. (printed Oct. 15, 2003).

htto://www.rfid.zebra.com/epc.htm, Electronic Product Code (PEC), 1 page (Printed Oct. 15, 2003).

http://www.eretailnews.com/features/0105epc1.htm, The Electronic Product Code (EPC), 2 pages (Printed Oct. 15, 2003).

http://www.eretailnews.com/Features/0105epcschema.htm, "The Electronic Product Code Schematic", 1 page (Printed Oct. 15, 2003).

http://www.rfidjournal.com/article/articleview/473/1/1/, "Second Source of Class 1 EPC Chips", *RFID Journal*, 2 pp. (Jun. 26, 2003).

http://money.cnn.com/services/tickerheadlines/prn/cItu045.PI.09162003122727.24911.htm "Manhattan Associates Announces Next-Generation Microsoft-Based RFID Solutions", *CNN Money*, 3 pp. (Sep. 16, 2003).

Engels, Daniel, "Technical Report, The Use of the Electronic Product Code", *Auto-ID Center, Massachusetts Institute of Technology*, 8 pp. (Feb. 1, 2003).

Auto-ID Center, Technical Report, "13.56 MHz ISM Band Class 1 Radio Frequency Identification Tag Interface Specification: Recommended Standard", Version 1.0.0, *Auto-ID Center, Massachusetts Institute of Technology*, 31 pp. (Feb. 1, 2003).

http://www.hightechaid.com/standards/18000.htm, "ISO/IEC 18000—RFID Air Interface Standards", 6 pp. (Printed Oct. 15, 2003).

ISO, Automatic Identification—Radio Frequency Identification for Item Management—Communications and Interfaces—Part 3: Physical Layer, Anti collision System and Protocol Values at 13.56 MHz Mode 4, #ISO/WD 18000-3-v40-4, 24 pp. (Mar. 1, 2001).

ISO/IEC, "ISO/IEC 18000, p. 3, Information Technology AIDC Techniques—RFID for Item Management—Air Interface, Part 3, Parameters for Air Interface Communications at 13.56 MHz", #ISO IEC SC31 WG4 FCD18000-3, 176 pp. May 27, 2002).

International Standard ISO/IEC, "Final Committee Draft, ISO/IEC 14443-1, Identification Cards—Contactless Integrated Circuit(s) Cards—Proximity Cards, Part 1: Physical Characteristics", 9 pp. (1997).

ISO/IEC, "Final Committee Draft, ISO/IEC 14443-2, Identification Cards—Contactless Integrated Circuit(s) cards—Proximity Cards—Part 2: Radio Frequency Power and Signal Interface", Editor D. Baddeley, #ISO-/IEC JTC/SC17/WG8, 16 pp. (Mar. 26, 1999).

Association Francaise de Normalization (AFNOR), "Identification Cards—Contactless Integrated Circuit(s) Cards—Proximity Cards—Part 3: Initialization and Anticollision", ISO/IEC, #ISO/IEC FDIS 14443-3:2000(E), 48 pp. (Jul. 13, 2000).

Association Francaise de Normalization (AFNOR), "Identification Cards—Contactless Integrated Circuit(s) Cards—Proximity Cards—Part 4: Transmission Protocol", ISO/IEC, #ISO/IEC FDIS 14443-4:2000(E), 37 pp. (Jul. 13, 2000).

Association Francaise de Normalization (AFNOR), "Identification Cards—Contactless Integrated Circuit(s) Cards—Vicinity Cards—Part 1: Physical Characteristics", Final Draft, ISO/IEC, #IS0/IEC FDIS 15693-1:2000(E), 8 pp, ( May 19, 2000).

Association Francaise de Normalization (AFNOR), "Identification Cards—Contactless Integrated Circuit(s) Cards—Vicinity Cards—Part 2: Air Interface and Initialization", Final Draft, ISO/IEC, #ISO/IEC FDIS 15693-2:2000(E), 23 pp. (Feb. 3, 2000).

ISO/IEC, "Identification Cards—Contactless Integrated Circuit(s) Cards—Vicinity Cards—Part 3: Anticollision and Transmission Protocol", ISO/IEC, #ISO/IEC CD 15693-3:1999(e), 48 pp. (Nov. 17, 1999).

ISO/IEC, "Automatic Identification—Radio Frequency Identification for Item Management—Communications and Interfaces—Part 3: Physical Layer, Anti-Collision System and Protocol Values at 13.56 MHz Mode 1", ISO/IEC, #ISO/WD 18000-3-v40-1, 105 pp. (Mar. 1, 2001).

Capetanakis, John I., "Tree Algorithms for Packet Broadcast Channels" *IEEE Transactions on Information Theory*, vol. IT-25, No. 5, pp. 505-515 (Sep. 1979).

Wood, Jr., Clifton W., U.S. Appl. No. 10/693,696, filed Oct. 23, 2003.
Wood, Jr., Clifton W., U.S. Appl. No. 11/859,360, filed Sep. 21, 2007.
Wood, Jr., Clifton W., U.S. Appl. No. 11/859,364, filed Sep. 21, 2007.
Wood, Jr., Clifton W., U.S. Appl. No. 10/693,697, filed Oct. 23, 2003.
Wood, Jr., Clifton W., U.S. Appl. No. 11/865,580, filed Oct. 1, 2007.
Wood, Jr., Clifton W., U.S. Appl. No. 11/865,584, filed Oct. 1, 2007.
Wood, Jr., Clifton W., U.S. Appl. No. 10/652,573, filed Aug. 28, 2008.
Wood, Jr., Clifton W., U.S. Appl. No. 11/862,121, filed Sep. 26, 2007.
Wood, Jr., Clifton W., U.S. Appl. No. 11/862,124, filed Sep. 26, 2007.
Wood, Jr., Clifton W., U.S. Appl. No. 11/862,130, filed Sep. 21, 2007.

International Application No. PCT/US08/50630, Written Opinion, Jun. 27, 2008.

International Application No. PCT/US08/50630, International Search Report, Jun. 27, 2008.

International Application No. PCT/US99/02288, International Search Report, Aug. 3, 1999.

Tuttle, John R., U.S. Appl. No. 11/755,073 entitled "Methods and Systems of Receiving Data Payload of RFID Tags," filed May 30, 2007.

International Application No. PCT/US99/02288, Written Opinion, Jan. 27, 2000.

USPTO Transaction History of U.S. Appl. No. 09/026,043, filed Feb. 19, 1998, entitled "Method of Addressing Messages and Communications System," now U.S. Patent No. 6,118,789.

USPTO Transaction History of U.S. Appl. No. 09/026,045, filed Feb. 19, 1998, entitled "Method of Addressing Messages, Methods of Establishing Wireless Communications, and Communications System," now U.S. Patent No. 6,072,801.

USPTO Transaction History of U.S. Appl. No. 09/026,050, filed Feb. 19, 1998, entitled "Method of Addressing Messages and Communications System," now U.S. Patent No. 6,061,344.

USPTO Transaction History of U.S. Appl. No. 09/026,248, filed Feb. 19, 1998, entitled "Method of Addressing Messages and Communications System," now U.S. Patent No. 6,275,476.

USPTO Transaction History of U.S. Appl. No. 09/551,304, filed Apr. 18, 2000, entitled "Method of Addressing Messages and Communications Systems," now U.S. Patent No. 6,282,186.

USPTO Transaction History of U.S. Appl. No. 09/556,235, filed Apr. 18, 2000, entitled "Method of Addressing Messages, and Establishing Communications Using a Tree Search Technique That Skips Levels," now U. S. Patent No. 6,226,300.

USPTO Transaction History of U.S. Appl. No. 09/617,390, filed Jul. 17, 2000, entitled "Method of Addressing Messages and Communications System," now U.S. Patent No. 6,307,847.

USPTO Transaction History of U.S. Appl. No. 09/773,461, filed Jan. 31, 2001, entitled "Method of Addressing Messages, Methods of Establishing Wireless Communications, and Communications System," now U.S. Patent No. 6,307,848.

USPTO Transaction History of U.S. Appl. No. 09/820,467, filed Mar. 28, 2001, entitled "Method of Addressing Messages and Communications System," now U.S. Patent No. 7,315,522.

USPTO Transaction History of U.S. Appl. No. 10/652,573, filed Aug. 28, 2003, entitled "Method of Addressing Messages and Communications System."

USPTO Transaction History of U.S. Appl. No. 10/693,696, filed Oct. 23, 2003, entitled "Method and Apparatus to Select Radio Frequency Identification Devices in Accordance with an Arbitration Scheme."

USPTO Transaction History of U.S. Appl. No. 10/693,697, filed Oct. 23, 2003, entitled "Method of Addressing Messages, Methods of Establishing Wireless Communications, and Communications System."

USPTO Transaction History of U.S. Appl. No. 11/270,204, filed Nov. 8, 2005, entitled "Method of Addressing Messages and Communications System."

USPTO Transaction History of U.S. Appl. No. 11/416,846, filed May 2, 2006, entitled "Method of Addressing Messages and Communications System."

USPTO Transaction History of U.S. Appl. No. 11/855,855, filed Sep. 14, 2007, entitled "Method of Addressing Messages and Communications System."

USPTO Transaction History of U.S. Appl. No. 11/855,860, filed Sep. 14, 2007, entitled "Method of Addressing Messages and Communications System."

USPTO Transaction History of U.S. Appl. No. 11/859,360, filed Sep. 21, 2007, entitled "Method of Addressing Messages and Communications System."

USPTO Transaction History of U.S. Appl. No. 11/859,364, filed Sep. 21, 2007, entitled "Method of Addressing Messages and Communications System."

USPTO Transaction History of U.S. Appl. No. 11/862,121, filed Sep. 26, 2007, entitled "Method of Addressing Messages and Communications System."

USPTO Transaction History of U.S. Appl. No. 11/862,124, filed Sep. 26, 2007, entitled "Method of Addressing Messages and Communications."

USPTO Transaction History of U.S. Appl. No. 11/862,130, filed Sep. 26, 2007, entitled "Method of Addressing Messages and Communications System."

USPTO Transaction History of U.S. Appl. No. 11/865,580, filed Oct. 1, 2007, entitled "Method of Addressing Messages, Methods of Establishing Wireless Communications, and Communications System."

USPTO Transaction History of U.S. Appl. No. 11/865,584, filed Oct. 1, 2007, entitled "Method of Addressing Messages, Methods of Establishing Wireless Communications, and Communications System."

METHOD OF ADDRESSING MESSAGES AND COMMUNICATIONS SYSTEM

CROSS REFERENCE TO RELATED APPLICATION

This is a continuation of U.S. patent application Ser. No. 09/820,467, filed Mar. 28, 2001, now U.S. Pat. No. 7,315,522 by inventor Clifton W. Wood, Jr., entitled "Method of Addressing Messages and Communications System", which in turn is a continuation of U.S. patent application Ser. No. 09/026,248, filed Feb. 19, 1998, now U.S. Pat. No. 6,275,476, both of which are incorporated herein by reference.

TECHNICAL FIELD

This invention relates to communications protocols and to digital data communications. Still more particularly, the invention relates to data communications protocols in mediums such as radio communication or the like. The invention also relates to radio frequency identification devices for inventory control, object monitoring, determining the existence, location or movement of objects, or for remote automated payment.

BACKGROUND OF THE INVENTION

Communications protocols are used in various applications. For example, communications protocols can be used in electronic identification systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

A communication system, such as a wireless identification system, typically includes two transponders: a commander station or interrogator, and a responder station or transponder device which replies to the interrogator.

If the interrogator has prior knowledge of the identification number of a device which the interrogator is looking for, it can specify that a response is requested only from the device with that identification number. Sometimes, such information is not available. For example, there are occasions where the interrogator is attempting to determine which of multiple devices are within communication range.

When the interrogator sends a message to a transponder device requesting a reply, there is a possibility that multiple transponder devices will attempt to respond simultaneously, causing a collision, and thus an erroneous message to be received by the interrogator. For example, if the interrogator sends out a command requesting that all devices within a communications range identify themselves, and gets a large number of simultaneous replies, the interrogator may not able to interpret any of these replies. Thus, arbitration schemes are employed to permit communications free of collisions.

In one arbitration scheme or system, described in commonly assigned U.S. Pat. Nos. 5,627,544; 5,583,850; 5,500,650; and 5,365,551, all to Snodgrass et al. and all incorporated herein by reference, the interrogator sends a command causing each device of a potentially large number of responding devices to select a random number from a known range and use it as that device's arbitration number. By transmitting requests for identification to various subsets of the full range of arbitration numbers, and checking for an error-free response, the interrogator determines the arbitration number of every responder station capable of communicating at the same time. Therefore, the interrogator is able to conduct subsequent uninterrupted communication with devices, one at a time, by addressing only one device.

Another arbitration scheme is referred to as the Aloha or slotted Aloha scheme. This scheme is discussed in various references relating to communications, such as *Digital Communications: Fundamentals and Applications*, Bernard Sklar, published January 1988 by Prentice Hall. In this type of scheme, a device will respond to an interrogator using one of many time domain slots selected randomly by the device. A problem with the Aloha scheme is that if there are many devices, or potentially many devices in the field (i.e. in communications range, capable of responding) then there must be many available slots or many collisions will occur. Having many available slots slows down replies. If the magnitude of the number of devices in a field is unknown, then many slots are needed. This results in the system slowing down significantly because the reply time equals the number of slots multiplied by the time period required for one reply.

An electronic identification system which can be used as a radio frequency identification device, arbitration schemes, and various applications for such devices are described in detail in commonly assigned U.S. patent application Ser. No. 08/705,043, filed Aug. 29, 1996, and incorporated herein by reference.

SUMMARY OF THE INVENTION

In one among many embodiments, the invention provides a system including an interrogator communicating to a selected one or more of a number of communications devices. A plurality of communications devices select random values independently of random values selected by other devices. The interrogator transmits a first signal requesting devices within a specified group of devices to respond, the specified group being less than or equal to all of the devices within a field of the interrogator. Devices receiving the first signal respectively determine if the respective device falls within the specified group and, if so, send a reply including a respective random value to the interrogator within a randomly selected time slot of a number of slots; and, if not, do not send a reply. The interrogator determines if a collision occurred between devices that sent a reply. The interrogator also creates a new, different specified group.

Other features and embodiments of the present invention will be apparent from the accompanying drawings and from the following detailed description.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
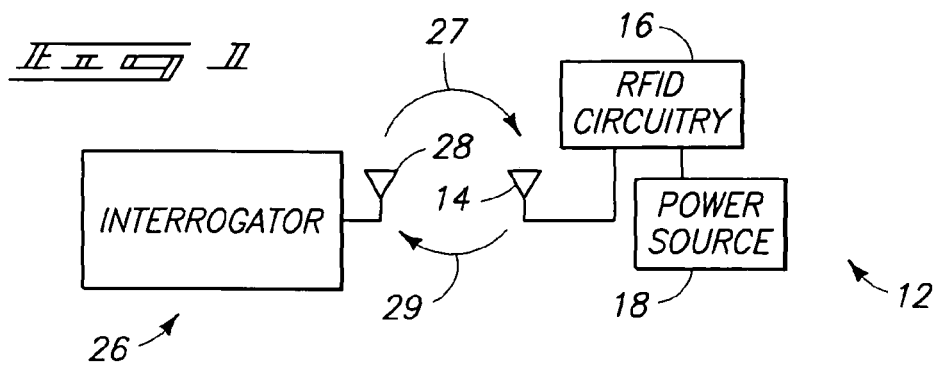
FIG. 1 is a high level circuit schematic showing an interrogator and a radio frequency identification device embodying the invention.

FIG. 1 illustrates a wireless identification device 12 in accordance with one embodiment of the invention. In the illustrated embodiment, the wireless identification device is a radio frequency data communication device 12, and includes RFID circuitry 16. In the illustrated embodiment, the RFID circuitry is defined by an integrated circuit as described in the above-incorporated patent application Ser. No. 08/705,043, filed Aug. 29, 1996. Other embodiments are possible. A power source 18 is connected to the integrated circuit 16 to supply power to the integrated circuit 16. In one embodiment, the power source 18 comprises a battery. The device 12 further includes at least one antenna 14 connected to the circuitry 16 for wireless or radio frequency transmission and reception by the circuitry 16.

The device 12 transmits and receives radio frequency communications to and from an interrogator 26. An exemplary interrogator is described in U.S. patent application Ser. No. 08/907,689, filed Aug. 8, 1997 and incorporated herein by reference. Preferably, the interrogator 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated.

Although only one device 12 is shown in FIG. 1, typically there will be multiple devices 12 that correspond with the interrogator 26, and the particular devices 12 that are in communication with the interrogator 26 will typically change over time. In the illustrated embodiment in FIG. 1, there is no communication between multiple devices 12. Instead, the devices 12 respectively communicate with the interrogator 26. Multiple devices 12 can be used in the same field of an interrogator 26 (i.e., within communications range of an interrogator 26). Similarly, multiple interrogators 26 can be in proximity to one or more of the devices 12.

The radio frequency data communication device 12 can be included in any appropriate housing or packaging. Various methods of manufacturing housings are described in commonly assigned U.S. patent application Ser. No. 08/800,037, filed Feb. 13, 1997, and incorporated herein by reference.

Figure 2:
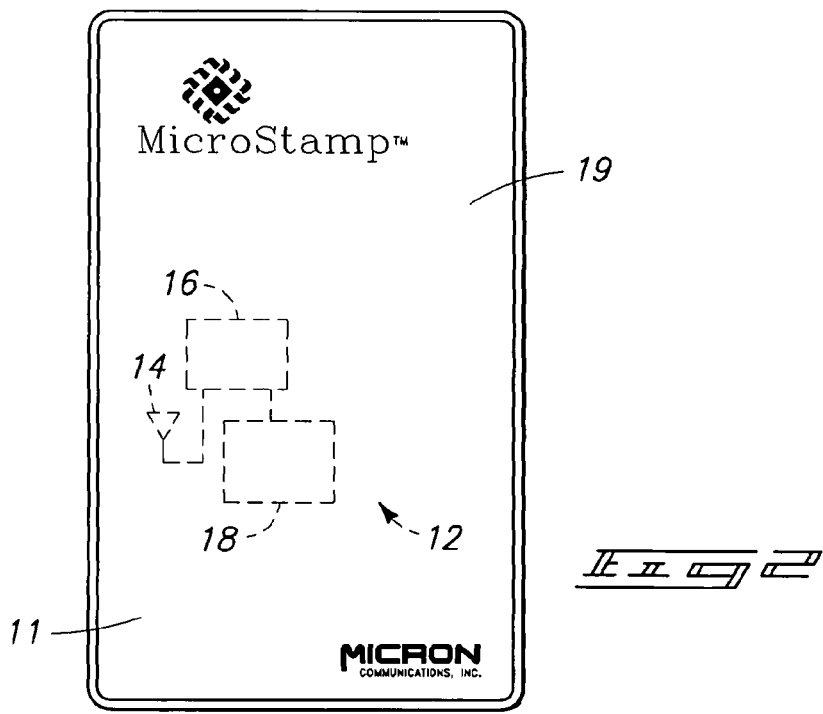
FIG. 2 is a front view of a housing, in the form of a badge or card, supporting the circuit of FIG. 1 according to one embodiment the invention.

FIG. 2 shows but one embodiment in the form of a card or badge 19 including the radio frequency data communication device 12, and a housing 11 including plastic or other suitable material. In one embodiment, the front face of the badge has visual identification features such as graphics, text, information found on identification or credit cards, etc.

Figure 3:
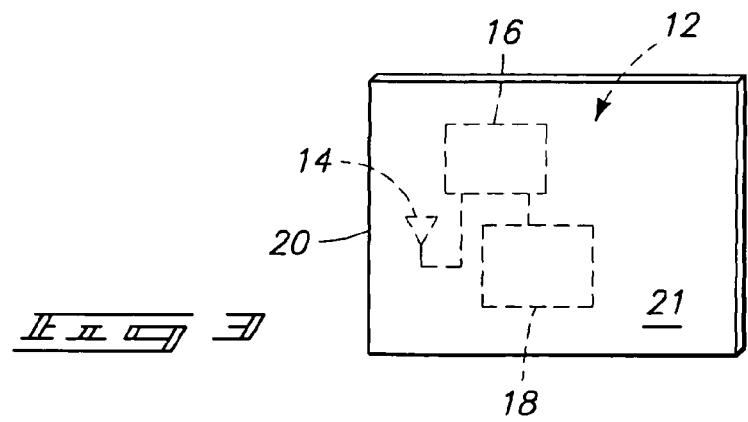
FIG. 3 is a front view of a housing supporting the circuit of FIG. 1 according to another embodiment of the invention.

FIG. 3 illustrates but one alternative housing supporting the device 12. More particularly, FIG. 3 shows a miniature housing 20 encasing the device 12 to define a tag which can be supported by an object (e.g., hung from an object, affixed to an object, etc.). Although two particular types of housings have been disclosed, the device 12 can be included in any appropriate housing.

If the power source 18 is a battery, the battery can take any suitable form. Preferably, the battery type will be selected depending on weight, size, and life requirements for a particular application. In one embodiment, the battery 18 is a thin profile or button-type cell forming a small, thin energy cell more commonly utilized in watches and small electronic devices requiring a thin profile. A conventional cell has a pair of electrodes, an anode formed by one face and a cathode formed by an opposite face. In an alternative embodiment, the power source 18 comprises a series connected pair of cells. Instead of using a battery, any suitable power source can be employed.

The circuitry 16 further includes a backscatter transmitter and is configured to provide a responsive signal to the interrogator 26 by radio frequency. More particularly, the circuitry 16 includes a transmitter, a receiver, and memory such as is described in U.S. patent application Ser. No. 08/705,043.

Radio frequency identification has emerged as a viable and affordable alternative to tagging or labeling small to large quantities of items. The interrogator 26 communicates with the devices 12 via an RF link, so all transmissions by the interrogator 26 are heard simultaneously by all devices 12 within range.

If the interrogator 26 sends out a command requesting that all devices 12 within range identify themselves, and gets a large number of simultaneous replies, the interrogator 26 may not be able to interpret any of these replies. Therefore, arbitration schemes are provided.

If the interrogator 26 has prior knowledge of the identification number of a device 12 which the interrogator 26 is looking for, it can specify that a response is requested only from the device 12 with that identification number. To target a command at a specific device 12, (i.e., to initiate point-on-point communication), the interrogator 26 must send a number identifying a specific device 12 along with the command. At start-up, or in a new or changing environment, these identification numbers are not known by the interrogator 26. Therefore, the interrogator 26 must identify all devices 12 in the field (within communication range) such as by determining the identification numbers of the devices 12 in the field. After this is accomplished, point-to-point communication can proceed as desired by the interrogator 26.

Generally speaking, RFID systems are a type of multi-access communication system. The distance between the interrogator 26 and devices 12 within the field is typically fairly short (e.g., several meters), so packet transmission time is determined primarily by packet size and baud rate. Propagation delays are negligible. In RFID systems, there is a potential for a large number of transmitting devices 12 and there is a need for the interrogator 26 to work in a changing environment, where different devices 12 are swapped in and out frequently (e.g., as inventory is added or removed). The inventors have determined that, in such systems, the use of random access methods work effectively for contention resolution (i.e., for dealing with collisions between devices 12 attempting to respond to the interrogator 26 at the same time).

RFID systems have some characteristics that are different from other communications systems. For example, one characteristic of the illustrated RFID systems is that the devices 12 never communicate without being prompted by the interrogator 26. This is in contrast to typical multiaccess systems where the transmitting units operate more independently. In addition, contention for the communication medium is short lived as compared to the ongoing nature of the problem in other multiaccess systems. For example, in a RFID system, after the devices 12 have been identified, the interrogator can communicate with them in a point-to-point fashion. Thus, arbitration in a RFID system is a transient rather than steady-state phenomenon. Further, the capability of a device 12 is limited by practical restrictions on size, power, and cost. The lifetime of a device 12 can often be measured in terms of number of transmissions before battery power is lost. Therefore, one of the most important measures of system performance in RFID arbitration is total time required to arbitrate a set of devices 12. Another measure is power consumed by the devices 12 during the process. This is in contrast to the measures of throughput and packet delay in other types of multi-access systems.

Figure 4:
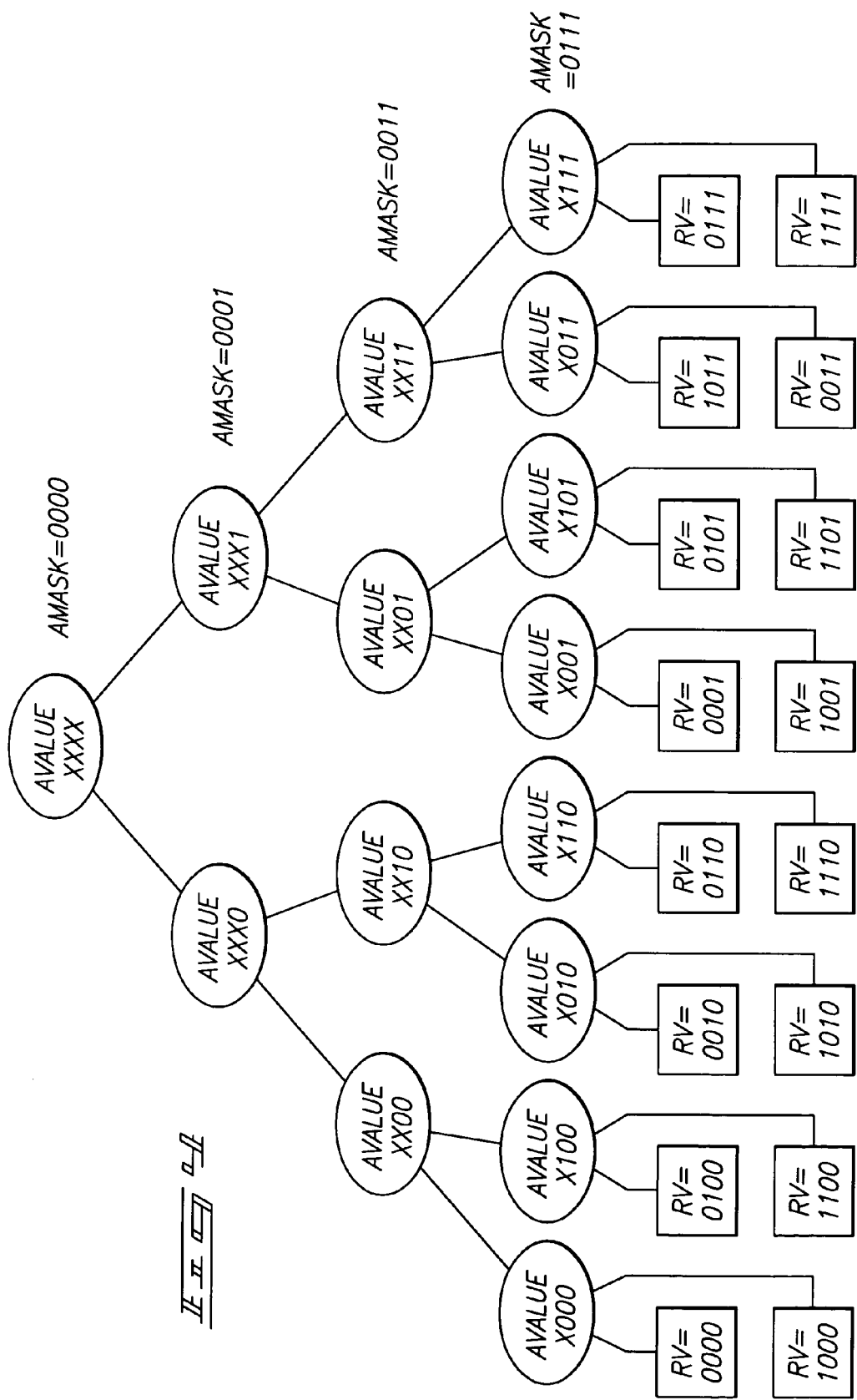
FIG. 4 is a diagram illustrating a tree splitting sort method for establishing communication with a radio frequency identification device in a field of a plurality of such devices, without collisions.

FIG. 4 illustrates one arbitration scheme that can be employed for communication between the interrogator and devices 12. Although the arbitration system is being described in connection with a wireless identification system or RFID system, this and other arbitration schemes disclosed herein can be employed in any communication system. Generally, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time.

Therefore, the interrogator 26 is able to conduct subsequent uninterrupted communication with devices 12, one at a time, by addressing only one device 12.

Three variables are used: an arbitration value (AVALUE), an arbitration mask (AMASK), and a random value ID (RV). The interrogator sends a command causing each device of a potentially large number of responding devices to select a random number from a known range and use it as that device's arbitration number. The interrogator sends an arbitration value (AVALUE) and an arbitration mask (AMASK) to a set of devices 12. The receiving devices 12 evaluate the following equation: (AMASK & AVALUE)==(AMASK & RV) wherein "&" is a bitwise AND function, and wherein "==" is an equality function. If the equation evaluates to "1" (TRUE), then the device 12 will reply. If the equation evaluates to "0," (FALSE), then the device 12 will not reply. By performing this in a structured manner, with the number of bits in the arbitration mask being increased by one each time, eventually a device 12 will respond with no collisions. Thus, a binary search tree methodology is employed.

An example using actual numbers will now be provided using only four bits, for simplicity, reference being made to FIG. 4. In Is one embodiment, sixteen bits are used for AVALUE and AMASK, respectively. Other numbers of bits can also be employed depending, for example, on the number of devices 12 expected to be encountered in a particular application, on desired cost points, etc.

Assume, for this example, that there are two devices 12 in the field, one with a random value (RV) of 1100 (binary), and another with a random value (RV) of 1010 (binary). The interrogator is trying to establish communications without collisions being caused by the two devices 12 attempting to communicate at the same time.

The interrogator sets AVALUE to 0000 (or all "don't care", indicated by the character "X" in FIG. 4) and AMASK to 0000. The interrogator transmits a command to all devices 12 requesting that they identify themselves. Each of the devices 12 evaluate (AMASK & AVALUE)==(AMASK & RV) using the random value RV that the respective devices 12 selected. If the equation evaluates to "1" (TRUE), then the device 12 will reply. If the equation evaluates to "0" (FALSE), then the device 12 will not reply. In the first level of the illustrated tree, AMASK is 0000 and anything bitwise ANDed with all zeros results in all zeros, so both the devices 12 in the field respond, and there is a collision.

Next, the interrogator sets AMASK to 0001 and AVALUE to 0000 and transmits an identify command. Both devices 12 in the field have a zero for their least significant bit, and (AMASK & AVALUE)==(AMASK & RV) will be true for both devices 12. For the device 12 with a random value of 1100, the left side of the equation is evaluated as follows (0001 & 0000)=0000. The right side is evaluated as (0001 & 1100)=0000. The left side equals the right side, so the equation is true for the device 12 with the random value of 1100. For the device 12 with a random value of 1010, the left side of the equation is evaluated as (0001 & 0000)=0000. The right side is evaluated as (0001 & 1010)=0000. The left side equals the right side, so the equation is true for the device 12 with the random value of 1010. Because the equation is true for both devices 12 in the field, both devices 12 in the field respond, and there is another collision.

Recursively, the interrogator next sets AMASK to 0011 with AVALUE still at 0000 and transmits an identify command. (AMASK & AVALUE)==(AMASK & RV) is evaluated for both devices 12. For the device 12 with a random value of 1100, the left side of the equation is evaluated as follows (0011 & 0000)=0000. The right side is evaluated as (0011 & 1100)=0000. The left side equals the right side, so the equation is true for the device 12 with the random value of 1100, so this device 12 responds. For the device 12 with a random value of 1010, the left side of the equation is evaluated as (0011 & 0000)=0000. The right side is evaluated as (0011 & 1010)=0010. The left side does not equal the right side, so the equation is false for the device 12 with the random value of 1010, and this device 12 does not respond. Therefore, there is no collision, and the interrogator can determine the identity (e.g., an identification number) for the device 12 that does respond.

De-recursion takes place, and the devices 12 to the right for the same AMASK level are accessed by setting AVALUE at 0010 and using the same AMASK value 0011.

The device 12 with the random value of 1010 receives a command and evaluates the equation (AMASK & AVALUE)==(AMASK & RV). The left side of the equation is evaluated as (0011 & 0010)=0010. The right side of the equation is evaluated as (0011 & 1010)=0010. The right side equals the left side, so the equation is true for the device 12 with the random value of 1010. Because there are no other devices 12 in the subtree, a good reply is returned by the device 12 with the random value of 1010. There is no collision, and the interrogator can determine the identity (e.g., an identification number) for the device 12 that does respond.

By recursion, what is meant is that a function makes a call to itself. In other words, the function calls itself within the body of the function. After the called function returns, de-recursion takes place and execution continues at the place just after the 11 function call; i.e. at the beginning of the statement after the function call.

For instance, consider a function that has four statements (numbered 1, 2, 3, 4) in it, and the second statement is a recursive call. Assume that the fourth statement is a return statement. The first time through the loop (iteration 1) the function executes the statement 2 and (because it is a recursive call) calls itself causing iteration 2 to occur. When iteration 2 gets to statement 2, it calls itself making iteration 3. During execution in iteration 3 of statement 1, assume that the function does a return. The information that was saved on the stack from iteration 2 is loaded and the function resumes execution at statement 3 (in iteration 2), followed by the execution of statement 4 which is also a return statement. Since there are no more statements in the function, the function de-recurses to iteration 1. Iteration 1, had previously recursively called itself in statement 2. Therefore, it now executes statement 3 (in iteration 1). Following that it executes a return at statement 4. Recursion is known in the art.

Consider the following code, which employs recursion, and which can be used to implement operation of the method shown in FIG. 4 and described above.

```
Arbitrate(AMASK, AVALUE)
    {
    collision = IdentifyCmnd(AMASK, AVALUE)
    if (collision) then
        {
        /* recursive call for left side */
        Arbitrate((AMASK < < 1) + 1, AVALUE)
        /* recursive call for right side */
        Arbitrate((AMASK < < 1) + 1, AVALUE + (AMASK + 1))
        }       /* endif */
    } /* return */
```

The symbol "<<" represents a bitwise left shift. "<<1" means shift left by one place. Thus, 0001<<1 would be 0010. Note, however, that AMASK is originally called with a value of zero, and 0000<<1 is still 0000. Therefore, for the first recursive call, AMASK=(AMASK<<1)+1. So for the first recursive call, the value of AMASK is 0000+0001=0001. For the second call, AMASK=(0001<<1)+1=0010+1=0011. For the third recursive call, AMASK=(0011<<1)+1=0110+1=0111.

The routine generates values for AMASK and AVALUE to be used by the interrogator in an identify command "IdentifyCmnd." Note that the routine calls itself if there is a collision. De-recursion occurs when there is no collision. AVALUE and AMASK would have values such as the following assuming there are collisions all the way down to the bottom of the tree.

| AVALUE | AMASK |
|--------|-------|
| 0000   | 0000  |
| 0000   | 0001  |
| 0000   | 0011  |
| 0000   | 0111  |
| 0000   | 1111* |
| 1000   | 1111* |
| 0100   | 0111  |
| 0100   | 1111* |
| 1100   | 1111* |

This sequence of AMASK, AVALUE binary numbers assumes that there are collisions all the way down to the bottom of the tree, at which point the Identify command sent by the interrogator is finally successful so that no collision occurs. Rows in the table for which the interrogator is successful in receiving a reply without collision are marked with the symbol "*". Note that if the Identify command was successful at, for example, the third line in the table then the interrogator would stop going down that branch of the tree and start down another, so the sequence would be as shown in the following table.

| AVALUE | AMASK  |
|--------|--------|
| 0000   | 0000   |
| 0000   | 0001   |
| 0000   | 0011*  |
| 0010   | 0011   |
| .      | .      |
| .      | .      |
| .      | .      |

This method is referred to as a splitting method. It works by splitting groups of colliding devices 12 into subsets that are resolved in turn. The splitting method can also be viewed as a type of tree search. Each split moves the method one level deeper in the tree. Either depth-first or breadth first traversals of the tree can be employed.

Another arbitration method that can be employed is referred to as the "Aloha" method. In the Aloha method, every time a device 12 is involved in a collision, it waits a random period of time before retransmitting. This method can be improved by dividing time into equally sized slots and forcing transmissions to be aligned with one of these slots. This is referred to as "slotted Aloha." In operation, the interrogator asks all devices 12 in the field to transmit their identification numbers in the next time slot. If the response is garbled, the interrogator informs the devices 12 so that a collision has occurred, and the slotted Aloha scheme is put into action. This means that each device 12 in the field responds within an arbitrary slot determined by a randomly selected value. In other words, in each successive time slot, the devices 12 decide to transmit their identification number with a certain probability.

The Aloha method is based on a system operated by the University of Hawaii. In 1971, the University of Hawaii began operation of a system named Aloha. A communication satellite was used to interconnect several university computers by use of a random access protocol. The system operates as follows. Users or devices transmit at any time they desire. After transmitting, a user listens for an acknowledgment from the receiver or interrogator. Transmissions from different users will sometimes overlap in time (collide), causing reception errors in the data in each of the contending messages. The errors are detected by the receiver, and the receiver sends a negative acknowledgment to the users. When a negative acknowledgment is received, the messages are retransmitted by the colliding users after a random delay if the colliding users attempted to retransmit without the random delay, they would collide again. If the user does not receive either an acknowledgment or a negative acknowledgment within a certain amount of time, the user "times out" and retransmits the message.

In the slotted Aloha scheme, a sequence of coordination pulses is broadcast to all stations (devices). As is the case with the pure Aloha scheme, packet lengths are constant. Messages are required to be sent in a slot time between synchronization pulses, and can be started only at the beginning of a time slot. This reduces the rate of collisions because only messages transmitted in the same slot can interfere with one another. The retransmission mode of the pure Aloha scheme is modified for slotted Aloha such that if a negative acknowledgment occurs, the device retransmits after a random delay of an integer number of slot times.

Figure 5:
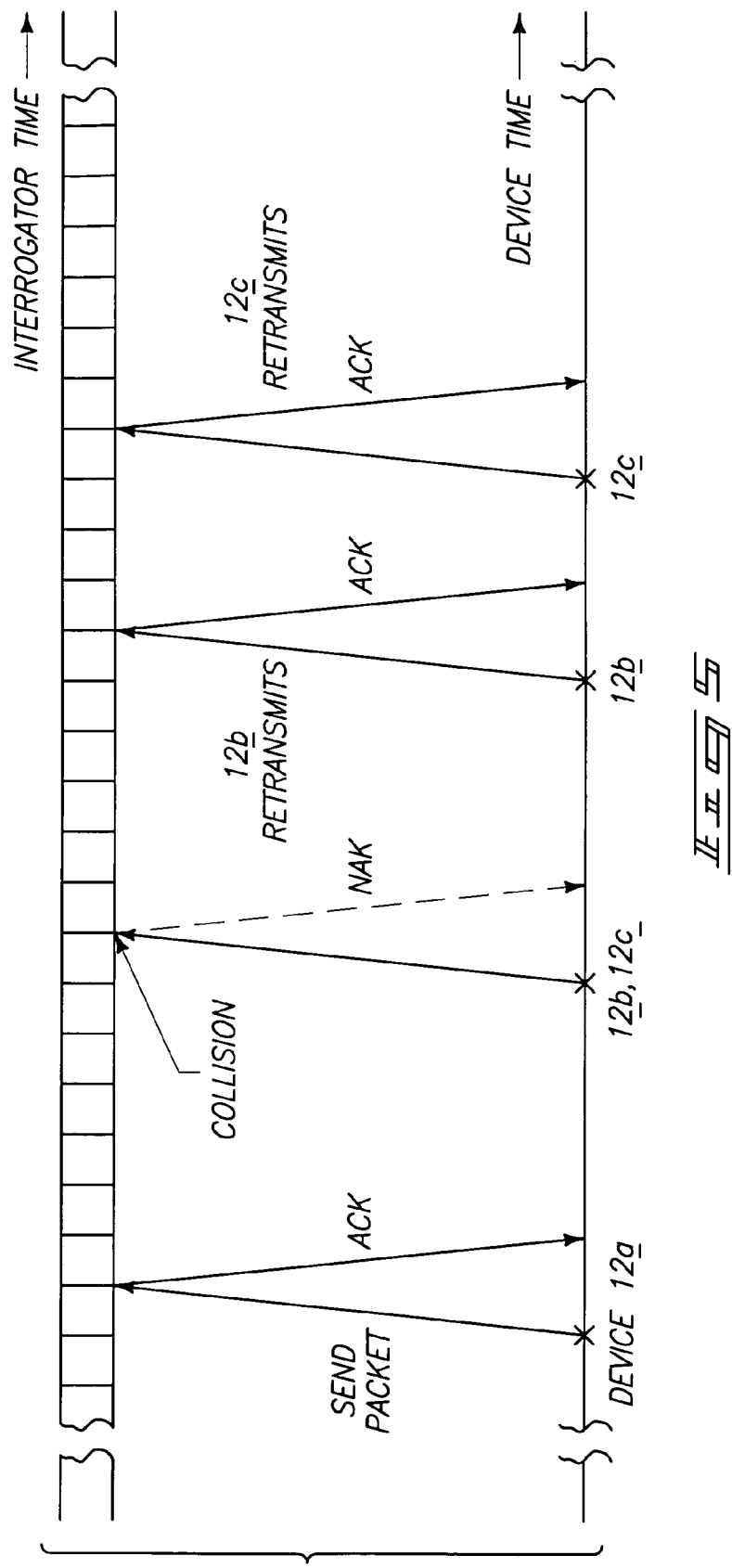
FIG. 5 is a time line plot illustrating operation of a slotted Aloha scheme.

FIG. 5 illustrates operation of the slotted Aloha scheme. FIG. 5 shows a packet of data bits transmitted by a first device 12a, which is substantially identical to the device 12. The interrogator 26 acknowledges receipt without collision, as indicated in FIG. 5 by the symbol ACK. FIG. 5 also shows devices 12b and 12c, also substantially identical to the device 12, simultaneously transmitting packets of data to the interrogator 26, resulting in a collision. The interrogator returns a negative acknowledgment, as indicated in FIG. 5 by the symbol NAK. The devices 12b and 12c then respectively select random numbers, and retransmit after a time delay corresponding to the selected random number. There is a possibility that the devices 12b and 12c will again transmit at the same times, causing another collision, but in that case they will retransmit again using newly selected random numbers until there is no collision.

Another form of Aloha scheme is called reservation-Aloha. The reservation-Aloha system has two basic modes: an unreserved mode, and a reserved mode.

In the unreserved mode, a time frame is established and divided into a number of small reservation subslots. Users (devices) use these subslots to reserve message slots. After requesting a reservation, the user (device) listens for an acknowledgment and a slot assignment.

In the reserved mode, a time frame is divided into a certain number of slots whenever a reservation is made. All but the last slot are used for message transmissions. The last slot is subdivided into subslots to be used for reservations. Users (devices) send message packets in their assigned portions of the slots reserved for message transmissions.

Figure 6:
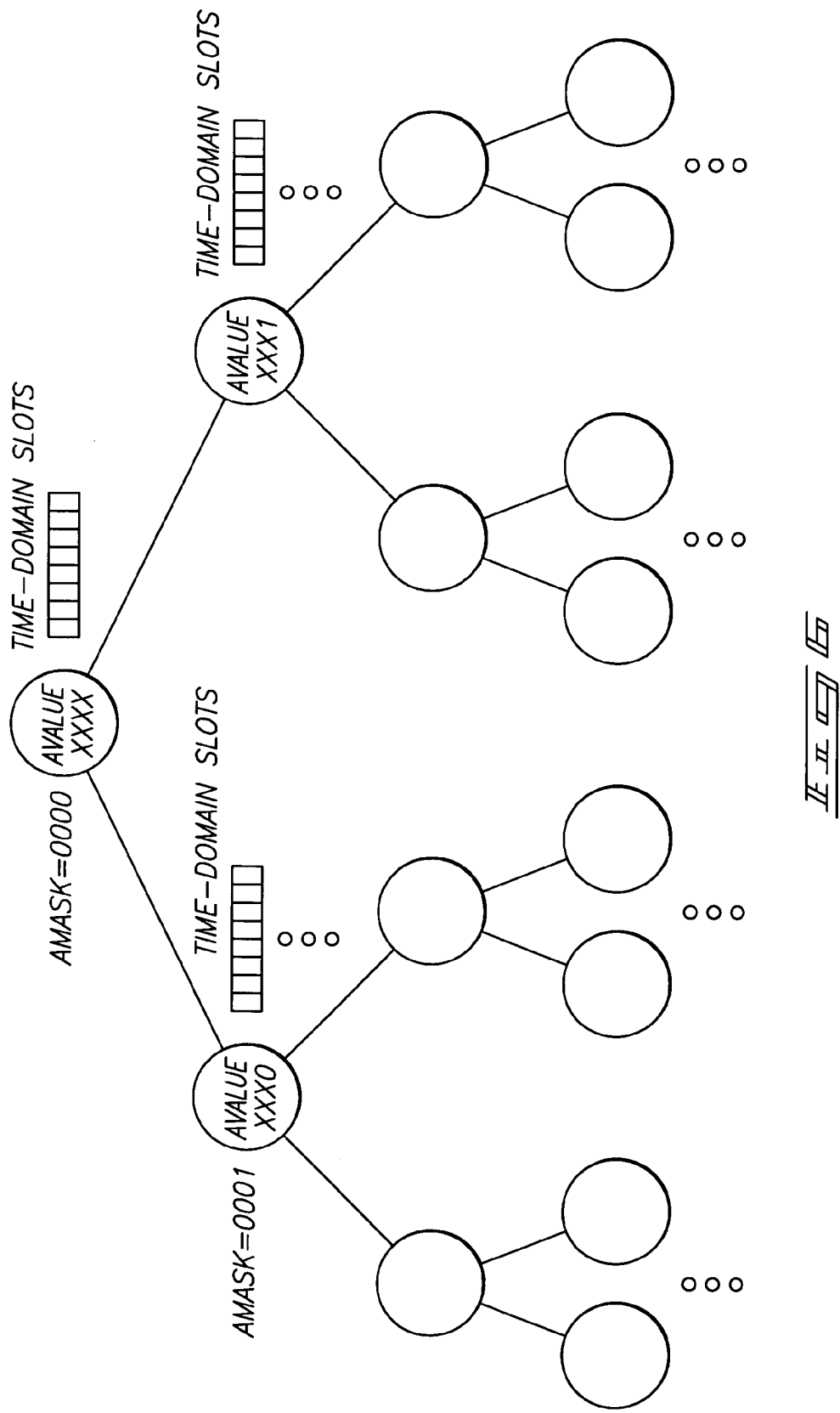
FIG. 6 is a diagram illustrating using a combination of a tree splitting sort method with an Aloha method for establishing communication with a radio frequency identification device in a field of a plurality of such devices.

FIG. 6 illustrates combining a tree sort method of a type such as the one shown in FIG. 4 with an Aloha method. Combining the two methods allows a minimal number of slots to be used and takes advantage of the conquer and divide approach of the tree sort method. The method shown in FIG. 6 proceeds in a manner similar to the manner described in connection with FIG. 4, except that devices 12 in the field that reply for the given AMASK and AVALUE, reply within a randomly selected time slot. This significantly reduces the number of collisions. In one embodiment, the reply includes the unique identification number of the particular device 12. In one embodiment, the reply includes the random value RV selected by the particular device 12. In one embodiment, the reply includes both the unique identification number of the particular device 12 as well as the random value RV selected by the same device 12.

In one embodiment, the same randomly selected time slot is used by a device 12 at different levels of the tree (i.e., for different values of AMASK and AVALUE). In another embodiment, different randomly selected times slots are used by a device 12 at different levels of the tree (i.e., for different values of AMASK and AVALUE). In one embodiment, a combination of these approaches is used. For example, one embodiment utilizes a method where the interrogator goes down the tree until some responses without collision are received, before the devices 12 re-randomize their Aloha random number. This can be classified as an adaptive method. Other adaptive methods are possible. For example, in one embodiment, the number of Aloha slots is reduced at lower levels of the tree. The number of slots can be reduced by the same number for each level down the tree, or by a number that varies depending on the number of levels down the tree. Thus, for example, the number of slots can remain constant through a progression down the tree until some responses without collision are received, at which point the number of slots is reduced.

Thus, this embodiment provides the advantages of both the Aloha methods and the tree sorting methods of establishing communications without collisions.

In another embodiment, levels of the search tree are skipped. Skipping levels in the tree, after a collision caused by multiple devices 12 responding, reduces the number of subsequent collisions without adding significantly to the number of no replies. In real-time systems, it is desirable to have quick arbitration sessions on a set of devices 12 whose unique identification numbers are unknown. Level skipping reduces the number of collisions, both reducing arbitration time and conserving battery life on a set of devices 12. In one embodiment, every other level is skipped. In alternative embodiments, more than one level is skipped each time.

The trade off that must be considered in determining how many (if any) levels to skip with each decent down the tree is as follows. Skipping levels reduces the number of collisions, thus saving battery power in the devices 12. Skipping deeper (skipping more than one level) further reduces the number of collisions. The more levels that are skipped, the greater the reduction in collisions. However, skipping levels results in longer search times because the number of queries-Identify commands) increases. The more levels that are skipped, the longer the search times. Skipping just one level has an almost negligible effect on search time, but drastically reduces the number of collisions. If more than one level is skipped, search time increases substantially. Skipping every other level drastically reduces the number of collisions and saves battery power without significantly increasing the number of queries.

Level skipping methods are described in a commonly assigned patent application Ser. No. 09/026,045 naming Clifton W. Wood, Jr. and Don Hush as inventors, titled "Method of Addressing Messages, Method of Establishing Wireless Communications, and Communications System," filed concurrently herewith, and incorporated herein by reference.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of communicating between an interrogator and one or more radio frequency identification (RFID) devices, the method comprising:
   placing the devices in communication range of the interrogator, wherein each of the devices accommodates a first predetermined number of bits to be used for a respective first value;
   causing the devices to select random values, wherein each of the devices chooses random values independently of random values selected by other devices;
   transmitting a signal from the interrogator requesting devices having first values within a specified group of one or more values to respond, the specified group being less than the entire set of values having the first number of bits;
   receiving the signal at the devices, and in response, each of the devices respectively determining if their respective first value falls within the specified group and, if so, sending a respective reply including a respective random value to the interrogator within a randomly selected time slot of a number of slots, and, if not, not sending a reply; and
   determining with the interrogator if collisions occurred between devices that sent the respective reply and, if so, adjusting the number of slots.

2. A method in accordance with claim 1 wherein the sending of the reply to the interrogator within the randomly selected time slot is in accordance with an Aloha technique.

3. A method in accordance with claim 1 wherein the sending of the reply to the interrogator within the randomly selected time slot is in accordance with a slotted Aloha technique.

4. A method in accordance with claim 1 wherein the method is an adaptive method.

5. A method in accordance with claim 1 wherein the respective random value is sixteen bits in length.

6. A method in accordance with claim 1 wherein sending the respective reply to the interrogator comprises sending a respective unique identification number of the device sending the reply.

7. A method in accordance with claim 1 wherein the respective first value is the respective random value of the device sending the reply.

8. A method in accordance with claim 6 wherein, after receiving a reply from a first device of the devices, the interrogator sends a command individually addressed to the first device, the command including the respective random value sent by the device in the reply.

9. A method in accordance with claim 8 wherein the time slot randomly selected by the first device is selected using a random number different from the first value of the first device.

10. A method comprising:
    providing a plurality of radio frequency identification (RFID) devices within a field of an interrogator, wherein each respective device of the devices stores a unique identification number and selects random values independently of random values selected by the other devices;
    transmitting from the interrogator a first signal requesting devices within a specified group of devices to respond, the specified group being less than or equal to all of the devices within the field of the interrogator;
    receiving the first signal at the devices, the devices receiving the first signal respectively determining if the respective device falls within the specified group and, if so, sending a reply including a respective random value to the interrogator within a randomly selected time slot of a number of slots, and, if not, not sending a reply; and
    determining using the interrogator if a collision occurred between devices that sent a reply, creating a new, different specified group, and transmitting a second signal from the interrogator to the devices requesting devices within the different specified group to respond.

11. A method in accordance with claim 10 wherein a predetermined number of bits to be used for the respective random value comprises sixteen bits.

12. A method of addressing messages from an interrogator to a selected one or more of a number of RFID devices, the method comprising:
    placing the devices in a field of the interrogator, each of the devices providing a first predetermined number of bits to store a respective identification number and a second predetermined number of bits to be used for random values wherein respective devices choose random values independently of random values selected by the other devices;
    transmitting from the interrogator a signal requesting devices storing first values that fall within a specified group of one or more values to respond, the specified group being less than the entire set of possible first values;
    receiving the signal at the devices, each respective device of the devices receiving the signal respectively determining if a respective first value stored in the respective device falls within the specified group and, if so, sending a respective reply to the interrogator within a randomly selected respective time slot of a number of possible time slots, in accordance with a slotted Aloha technique, and, if not, not sending a reply, wherein sending the respective reply to the interrogator comprises communicating both a respective random value chosen by the respective device and the respective identification number of the respective device, and wherein the respective time slot randomly selected by the respective device is selected using a random number different from the respective random value of that device;
    determining with the interrogator if collisions occurred between devices that sent a reply and, if so, adjusting the number of possible time slots; and
    if a reply without collision is received from a device, the interrogator sending a command individually addressed to that device.

13. A method of addressing messages from an interrogator to a selected one or more of a number of RFID devices in accordance with claim 12 wherein the number of possible time slots is indicated by the signal transmitted by the interrogator, and wherein the respective first value is not determined by the respective identification number.

14. A method of addressing messages from an interrogator to a selected one or more of a number of RFID devices in accordance with claim 12 wherein the second predetermined number of bits is sixteen.

15. A method comprising:
providing a plurality of radio frequency identification (RFID) devices within a field of an interrogator, wherein each respective device of the devices stores a unique identification number and selects random values independently of random values selected by other devices;
transmitting from the interrogator a first signal requesting devices within a specified group of devices to respond, the specified group being less than or equal to all of the devices within the field of the interrogator;
receiving the first signal at the devices, the devices receiving the first signal respectively determining if the respective device falls within the specified group and, if so, sending a reply to the interrogator within a randomly selected time slot of a number of possible time slots, in accordance with an Aloha technique, and, if not, not sending a reply, wherein sending a reply to the interrogator comprises communicating both a respective random value chosen by the respective device and the respective identification number of the respective device, and wherein the respective time slot randomly selected by the respective device is selected using a random number different from the respective random value of that device;
determining with the interrogator if a collision occurred between devices that sent a reply, creating a new, different specified group, and transmitting a second signal from the interrogator to the devices requesting devices within the different specified group to respond; and
if a reply is received from a device, the interrogator sending a command individually addressed to that device;
wherein the number of possible time slots is indicated by the interrogator.

16. A method in accordance with claim 15 wherein the respective random value is sixteen bits in length.

17. A system comprising:
an interrogator to transmit a first signal requesting a specified group of devices to respond, the specified group being less than all devices that receive and process the first signal, to detect collisions between the specified group of devices, and to transmit a second signal to all of the devices that received and processed the first signal, the second signal requesting a different specified group of devices to respond; and
the devices to wirelessly communicate with the interrogator, each of the devices storing a unique identification number and providing a predetermined number of bits to be used for independently generated random values, wherein upon receiving the first signal each respective device of the devices processes the first signal to determine if the respective device falls within the specified group of devices and, if so, sends a reply including a random value to the interrogator within a randomly selected time slot of a number of slots.

18. A system in accordance with claim 17 wherein the reply is sent to the interrogator within the randomly selected time slot in accordance with an Aloha technique.

19. A system in accordance with claim 17 wherein the reply is sent to the interrogator within the randomly selected time slot in accordance with a slotted Aloha technique.

20. A system in accordance with claim 17 wherein the random value is sixteen bits in length.

21. A system in accordance with claim 17 wherein the reply includes the unique identification number of the respective device.

22. A system in accordance with claim 17 wherein the interrogator is programmed to send a command to a first device of the devices, after receiving the reply from the first device, the command including the random value sent by the first device in the reply.

23. A system in accordance with claim 22 wherein the time slot randomly selected by the first device is selected using a random number different from the random value of the first device, and wherein the first device is to communicate the unique identification number to the interrogator within the randomly selected time slot.

24. A system comprising:
an interrogator to communicate to a selected one or more of a number of communications devices, to transmit a first signal that specifies a specified group of devices, the specified group being less than or equal to all of the devices within a field of the interrogator, to determine if a collision occurred between devices that sent a reply, and to create a new, different specified group; and
a plurality of communications devices to select random values independently of random values selected by other of the devices, to receive the first signal and respectively determine if the respective device falls within the specified group and, if so, to send a reply including a respective random value to the interrogator within a randomly selected time slot of a number of slots, and, if not, to not send a reply.

25. A system in accordance with claim 24 wherein each respective random value comprises sixteen bits, and wherein the devices are to further send a respective identification number.

26. A method comprising:
communicating to a selected one or more of a number of communications devices;
storing a unique identification number, storing random values, and selecting random values independently of random values selected by other devices;
transmitting a first signal requesting a specified group of devices to respond, the specified group being a portion of all similarly configured devices within a field of an interrogator;
receiving the first signal by all of the devices within the field of the interrogator, and each of all of the devices respectively determining if the respective device falls within the specified group and, if so, sending a reply to the interrogator within a randomly selected time slot of a number of possible time slots, in accordance with an Aloha technique, and, if not, not sending a reply, wherein sending a reply to the interrogator comprises communicating both a respective random value chosen by the respective device and a respective identification number of the respective device, and wherein the respective time slot randomly selected by the respective device is selected using a random number different from the respective random value of that device;
determining if a collision occurred between devices that sent a reply, creating a new, different specified group; and
sending a command, including the respective random value chosen by the respective device to the device after receiving the respective random value from the device without a collision;
wherein the number of possible slots is indicated by the interrogator.

27. A method in accordance with claim 26 wherein the respective random value is sixteen bits in length.

28. A method comprising:
communicating to a selected one or more of a number of communications devices;
storing unique identification numbers respectively having a first predetermined number of bits, storing a second predetermined number of bits to be used for respective random values, and selecting random values independently of random values selected by other devices;
defining a group of devices, the defined group being a subset of all possible devices within a field of an interrogator, and transmitting a first signal requesting devices within the defined group to respond;
in response to receiving the first signal, determining if the respective device falls within the defined group and, if so, sending a reply to the interrogator within a randomly selected time slot of a number of possible time slots, in accordance with an Aloha technique, and, if not, not sending a reply, wherein sending a reply to the interrogator comprises communicating both a respective random value chosen by the respective device and the respective identification number of the respective device, wherein the respective time slot randomly selected by the respective device is selected using a random number different from the respective random value of that device, and wherein the number of possible slots is indicated by the interrogator;
determining if a collision occurred between devices that sent a reply; and
defining a new, different specified group.

29. A method in accordance with claim 28 wherein the respective random value is sixteen bits in length.

30. A method in accordance with claim 28 wherein the first predetermined number of bits for the respective random value is sixteen.

31. A system comprising:
an interrogator to communicate to a selected one or more of a number of communications devices and to transmit a signal requesting devices having first values within a specified group of one or more values to respond, the specified group being less than the entire set of values having a first predetermined number of one or more bits, and to determine if a collision occurred between devices that sent a reply and, in response, adjusting a number of possible time slots; and
a plurality of communications devices, wherein each of the devices accommodates the first predetermined number of one or more bits to be used for a respective first value, the devices to respectively store respective random values, respective devices to select random values independently of random values selected by other devices, devices respectively to, in response to receiving the signal, determine if their respective first value falls within the specified group and, if so, send a reply to the interrogator within a randomly selected time slot of the number of possible time slots, and, if not, not send a reply.

* * * * *